No. 709,700. Patented Sept. 23, 1902.
C. W. DROWN.
BRIDLE BIT.
(Application filed Jan. 8, 1902.)
(No Model.)

Witnesses:
C. D. Kesler.
C. M. Sweeney.

Inventor:
C. W. Drown,
By Henry Calvert,
Atty.

THE NORRIS PETERS CO., PHOTO-LITHO., WASHINGTON, D. C.

UNITED STATES PATENT OFFICE.

CHARLES W. DROWN, OF BRATTLEBORO, VERMONT.

BRIDLE-BIT.

SPECIFICATION forming part of Letters Patent No. 709,700, dated September 23, 1902.

Application filed January 8, 1902. Serial No. 88,881. (No model.)

*To all whom it may concern:*

Be it known that I, CHARLES W. DROWN, a citizen of the United States, residing at Brattleboro, in the county of Windham and State of Vermont, have invented certain new and useful Improvements in Bridle-Bits, of which the following is a specification, reference being had therein to the accompanying drawings.

The present invention relates to bridle-bits, and has for its object to provide a bit which will render the control of a fractious or frightened horse extremely easy, and yet one which will not injure the mouth of the animal or subject it to hard or inhuman treatment in controlling it.

Figure 1:
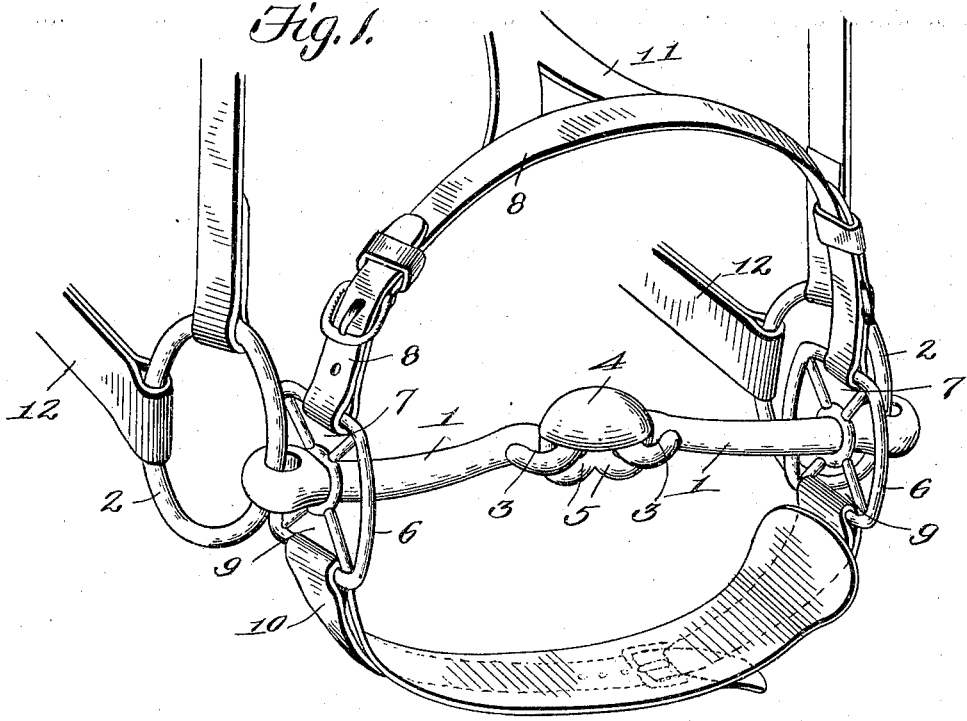
Figure 2:
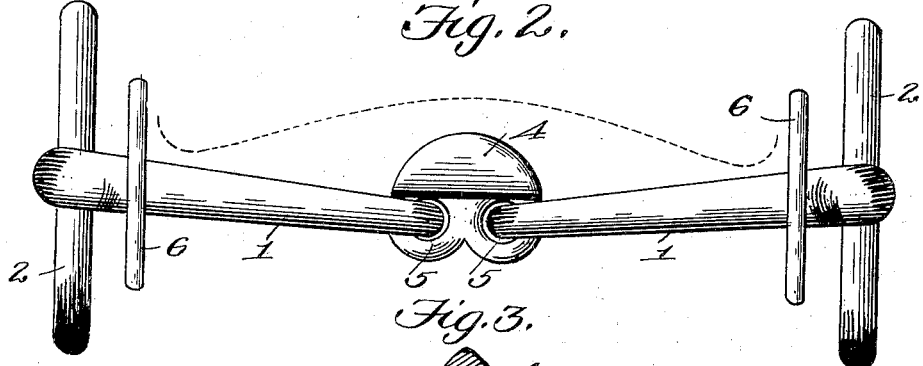
Figure 3:
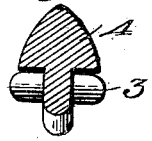

In the drawings which accompany and form a part of this specification, Figure 1 is a perspective view showing the bit and so much of the bridle-straps, reins, &c., as are necessary to illustrate the invention. Fig. 2 is a detail view of the bit, showing the center bit-roll and the bit-bars secured thereto, illustrating diagrammatically the action of the bit in the animal's mouth. Fig. 3 is a detail sectional view of the center bit-roll and bit-bars to show the bit-joint.

Referring to the drawings by numerals, like numbers indicating like parts in the several views, 1 indicates the bit-bars, which are preferably of the ordinary form of snaffle bit-bars, said bars 1 being provided with the usual rings 2 at their outer ends for the attachment of the bridle cheek-straps, reins, &c., while at their inner ends they have the eyes 3, by means of which they are jointed to a center bit-roll 4. This bit-roll 4 is a substantially cone-shaped piece having a flat lower face with a pair of integral eyes 5 depending therefrom, to which eyes 5 the eyes 3 at the inner ends of the bit-bars 1 are jointed. The bit-bars 1 play freely about the bit-roll 4 except in an upward direction, movement of said bars 1 upwardly being prevented by the overhanging base of the bit-roll 4, which extends beyond the eyes 5 and forms an abutment or stop against which the bit-bars 1 impinge, (see Figs. 2 and 3,) thus forming a bit which has a joint breakable in all directions except downwardly.

Mounted upon each of the bit-bars 1, so as to render freely thereon, are skeleton cheek-plates 6, substantially rectangular in form, said cheek-plates 6 being provided at their upper ends with openings 7, through which the ends of a strap 8 pass, said strap 8 forming a nose or upper jaw-strap, which passes over the animal's nose and keeps the bit properly positioned in the mouth. The lower ends of said cheek-plates 6 are provided with openings 9, through which a lower jaw-strap 10 passes, said lower jaw-strap 10 being drawn snugly, but not too tightly, against the lower jaw of the animal.

With the arrangement of upper jaw-strap 8 and lower jaw-strap 10 above described, the mouth of the animal will be kept closed and the bit will be maintained in proper position for best controlling the animal, since a "pulling" or fractious horse cannot displace the bit by opening his mouth, and so render the bit defective as a means of control.

To the upper nose-trap 8 the check-rein 11 is secured, an overdraw-check being shown in the present case, so that the pull of the check-rein 11 comes upon the cheek-plates 6 and through them is transmitted to the bit-bars 1. It will be observed that owing to the novel bit-joint provided, in which the inner ends of the bit-bars 1, impinging against the abutment or stop formed by the under side of the center bit-roll 4 prevent a downward breaking of the bit, the bit does not break at its joint when pull is exerted on the bit-bars 1 by the check, but is rigid against the pull of the check, thus forming a practically straight bar-bit, so that the severe and constant pressure on the sides of the mouth of the animal caused by the hinging or breaking action of the ordinary jointed snaffle-bit is obviated. At the same time the center bit-roll 4 is not forced into the roof of the horse's mouth (denoted by dotted lines in Fig. 2) by the check-rein pull, owing to the fact that the said bit-roll 4 drops slightly below the horizontal center of the bit when the bit-bars 1 are pulled upwardly by the check and the upper jaw of the animal bears only on the bit-bars 1 at the sides of the mouth. When the driving-reins 12 are drawn taut, however, the bit-joint will break and the rounded or coned bit-roll 4 will be forced against the roof of the animal's mouth and quickly subdue it, the arrangement of jaw-straps 8 and 10, as above stated, preventing the mouth from being opened and the bit displaced.

From the foregoing it will be seen that a bit is provided which will not irritate a horse's mouth under ordinary circumstances, and yet one which is very powerful and effective for the purpose of controlling the animal by means of the driving-reins should it become frightened or vicious.

Having thus described my invention, I claim and desire to secure by Letters Patent—

1. In a jointed bit; the combination with bit-bars; of a center bit-roll with which said bars are connected at their inner ends; stops on said bit-roll against which the said bit-bars impinge so as to prevent breaking of the bit at the joint in a downward direction, but leaving it free to break in other directions, whereby a straight bit rigid against downward pressure is provided; cheek-plates slidingly mounted on said bit-bars, an adjustable lower jaw-strap secured to the lower ends of said cheek-plates; and an adjustable upper jaw-strap and check-rein secured to the upper ends of said cheek-plates.

2. A jointed bit comprising bit-bars; and a center bit-roll to which said bit-bars are jointed, said bit-roll having a flat bottom or under side and centrally-placed eyes depending therefrom to form joint connections for the bit-bars; said bit-bars impinging against said flat bottom so as to prevent breaking the bit downwardly, but leaving it free to break in other directions.

In testimony whereof I affix my signature in presence of two witnesses.

CHARLES W. DROWN.

Witnesses:
F. DE STOWE,
ARTHUR C. SPENCER.